(12) United States Patent
Han et al.

(10) Patent No.: US 10,333,691 B2
(45) Date of Patent: Jun. 25, 2019

(54) RECEIVER AND SIGNAL PROCESSING METHOD

(71) Applicant: HUAWEI TECHNOLOGIES CO., LTD., Shenzhen, Guangdong (CN)

(72) Inventors: Dong Han, Chengdu (CN); Zhiyong Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/709,999

(22) Filed: Sep. 20, 2017

(65) Prior Publication Data
US 2018/0034620 A1 Feb. 1, 2018

Related U.S. Application Data

(63) Continuation of application No. PCT/CN2015/074947, filed on Mar. 24, 2015.

(51) Int. Cl.
*H04L 7/00* (2006.01)
*H01Q 1/24* (2006.01)
*H04B 1/00* (2006.01)

(52) U.S. Cl.
CPC ........... *H04L 7/0087* (2013.01); *H01Q 1/247* (2013.01); *H04B 1/0007* (2013.01)

(58) Field of Classification Search
CPC .......................... H04L 25/0087; H04B 1/0007
See application file for complete search history.

(56) References Cited

U.S. PATENT DOCUMENTS 8,660,214 B1 2/2014 Huynh
2007/0143078 A1* 6/2007 Vetterli ............... H03M 1/1285
702/189

(Continued)

FOREIGN PATENT DOCUMENTS

CN 1449167 A 10/2003
CN 1719818 A 1/2006

(Continued)

OTHER PUBLICATIONS

International Search Report dated Dec. 21, 2015 in corresponding International Patent Application No. PCT/CN2015/074947, 5 pp.

(Continued)

*Primary Examiner* — Kabir A Timory
(74) *Attorney, Agent, or Firm* — Staas & Halsey LLP

(57) ABSTRACT

Embodiments of the present disclosure disclose a receiver, including a high-speed sampling module (110), an analog Fast Fourier Transform (AFFT) module (120), a selection switch module (130), a low-speed analog to digital converter (ADC) module (140), and a control module (150). The high-speed sampling module (110) is configured to sample a received signal and output a sampled signal; the AFFT module (120) is configured to perform time-to-frequency conversion on the sampled signal and output an analog frequency domain signal; the selection switch module (130) is configured to transmit the analog frequency domain signal to the low-speed ADC module (140); and the control module (150) is configured to perform configuration on a sampling rate of the high-speed sampling module (110), a quantity of points of Fast Fourier Transform that are used b the AFFT module (120) for performing time-to-frequency conversion, and a target input port of the selection switch module (130).

15 Claims, 4 Drawing Sheets

(56) References Cited

U.S. PATENT DOCUMENTS

| | | | |
|---|---|---|---|
| 2008/0101215 A1 | 5/2008 | Tanaka et al. | |
| 2008/0101507 A1 | 5/2008 | Oketani et al. | |
| 2010/0164763 A1* | 7/2010 | Kidambi | H03M 1/0624 |
| | | | 341/118 |
| 2014/0079098 A1* | 3/2014 | Harjani | H04B 1/001 |
| | | | 375/219 |

FOREIGN PATENT DOCUMENTS

| | | |
|---|---|---|
| CN | 1798281 A | 7/2006 |
| CN | 101183895 A | 5/2008 |
| CN | 101202729 A | 6/2008 |
| CN | 103973324 A | 8/2014 |
| EP | 0 975 096 A2 | 1/2000 |

OTHER PUBLICATIONS

International Search Report dated Dec. 21, 2015 corresponding to International Patent Application No. PCT/CN2015/074947.
Rivet, et al., "A Universal Radio Frequency Receiver Architecture Based on Sampled Analog Signal Processing," 2007 IEEE,XP31242832A, pp. 1449-1452.
Extended European Search Report dated Mar. 19, 2018, in corresponding European Patent Application No. 15885846.4, 9 pgs.
Office Action, dated Apr. 30, 2019, in Chinese Application No. 201580075886.9 (15 pp.).

* cited by examiner

RECEIVER AND SIGNAL PROCESSING METHOD

CROSS-REFERENCE TO RELATED APPLICATIONS

This application is a continuation of International Application No. PCT/CN2015/074947, filed on Mar. 24, 2015, the disclosure of which is hereby incorporated by reference in its entirety.

TECHNICAL FIELD

The present disclosure relates to the field of communications technologies, and in particular, to a receiver and a signal processing method.

BACKGROUND

With continuous development of mobile communications technologies, increasingly high bandwidth required for data transmission imposes a higher requirement on an operating bandwidth of a receiver. The receiver is a device used for converting a radio frequency signal to a digital baseband signal. A conventional receiver includes a superheterodyne receiver and an I/Q (in-phase/quadrature) demodulator receiver. A structure of the superheterodyne receiver is shown in FIG. 5(A). A digital baseband signal is output after a radio frequency signal passes through a filter, an amplifier, a frequency mixer, and a detector. The frequency mixer is configured to perform frequency mixing on a received signal and a signal generated by an oscillator, to obtain an intermediate frequency signal. Because channel bandwidth of the frequency mixer in the receiver generally does not exceed twice the center frequency of the intermediate frequency signal, and the center frequency of the intermediate frequency signal generally does not exceed 500 MHz, an operating bandwidth of the receiver is limited by the channel bandwidth of the frequency mixer and cannot reach a GHz magnitude. A structure of the I/Q demodulator receiver is shown in FIG. 5(B). A digital baseband signal is output after a radio frequency signal passes through a filter, an amplifier, an I/Q demodulator, and a detector. The I/Q demodulator is configured to perform frequency conversion on a received signal. Because channel bandwidth of the I/Q demodulator does not exceed 500 MHz, the operating bandwidth of the receiver is limited by the channel bandwidth of the /IQ demodulator and cannot reach a GHz magnitude.

A direct radio frequency (Direct RE) receiver is a new-generation receiver. A structure of the direct radio frequency receiver is shown in FIG. 5(C). A digital baseband signal is output after a radio frequency signal passes through a filter, an amplifier, an analog to digital converter, and a converter. The direct radio frequency receiver directly performs high-speed analog-to-digital conversion on the radio frequency signal without a need of performing frequency mixing or frequency conversion; therefore, an operating bandwidth of the direct radio frequency receiver depends on only sampling bandwidth of the analog-to-digital conversion, so that the operating bandwidth of the entire receiver can be increased by increasing the sampling bandwidth, so as to reach the GHz magnitude. The analog to digital converter of the direct radio frequency receiver uses a high-speed analog to digital converter (ADC), and requires that sampling bandwidth of the high-speed ADC is much higher than the operating bandwidth of the direct radio frequency receiver, for example, for an operating bandwidth of 1 GHz, sampling bandwidth is required to be higher than 2 GHz. However, the high-speed ADC with high sampling bandwidth has extremely high production complexity and costs, thereby restricting the development of the direct radio frequency receiver.

Therefore, how to enable an operating bandwidth of a receiver to reach the GHz magnitude without increasing costs and production complexity of the receiver is an urgent problem to be solved at present.

SUMMARY

Embodiments of the present disclosure provide a receiver and a signal processing method, so that an operating bandwidth of the receiver can reach a GHz magnitude, and the receiver has advantages such as low costs and low complexity.

A first aspect of the embodiments of the present disclosure provides a receiver, where the receiver includes a high-speed sampling module, an analog Fast Fourier Transform AFFT module, a selection switch module, a low-speed analog to digital converter ADC module, and a control module, where:

the high-speed sampling module is connected to the AFFT module, the AFFT module is connected to the selection switch module, the selection switch module is connected to the low-speed ADC module, and the control module is connected to the high-speed sampling module, the AFFT module, the selection switch module, and the low-speed ADC module; and the high-speed sampling module is configured to sample a received signal and output a sampled signal to the AFFT module; the AFFT module is configured to perform time-to-frequency conversion on the sampled signal and output an analog frequency domain signal to the selection switch module; the selection switch module is configured to transmit the analog frequency domain signal to the low-speed ADC module; the low-speed ADC module is configured to convert the analog frequency domain signal to a digital baseband signal; and the control module is configured to perform configuration on a sampling rate of the high-speed sampling module, a quantity of points of Fast Fourier Transform that are used by the AFFT module for performing time-to-frequency conversion, and a target input port of the selection switch module.

In a first possible implementation manner of the first aspect, the high-speed sampling module includes one input port and M output ports, where M is an integer greater than 2; and the high-speed sampling module is specifically configured to connect the input port and each output port in turn by means of switching according w the configured sampling rate, to sample the received signal, and output the obtained sampled signal to the AFFT module.

With reference to the first aspect and the first possible implementation manner of the first aspect, in a second possible implementation manner, the receiver further includes a clock module, and the control module is connected to the high-speed sampling module by using the clock module;

the clock module is configured to send a clock signal with a specified period to the high-speed sampling module, where the specified period is equal to a reciprocal of the sampling rate; and the high-speed sampling module is specifically configured to connect the input port and each output port in turn by means of switching according to the clock signal.

With reference to the first aspect and the first possible implementation manner of the first aspect, in a third possible implementation manner, the sampling rate is greater than twice of a bandwidth of the received signal.

With reference to the first aspect and the third possible implementation manner of the first aspect, in a fourth possible implementation manner, the sampling rate reaches a GHz magnitude.

With reference to any one of the first aspect, or the first to the fourth possible implementation manners of the first aspect, in a fifth possible implementation manner, the AFFT module includes M input ports and M Output ports, where the M input ports of the AFFT module are respectively connected to the M output ports of the high-speed sampling module; and the AFFT module is specifically configured to perform, by means of the Fast Fourier Transform, time-to-frequency conversion on the sampled signal input horn the input port, and output, by using the output port, the analog frequency domain signal obtained after time-to-frequency conversion to the selection switch module.

With reference to the first aspect and the fifth possible implementation manner of the first aspect, in a sixth possible implementation manner, the selection switch module includes M input ports and one output port; the target input port of the selection switch module is one of the M input ports; the M input ports of the selection switch module are respectively connected to the M output ports of the AFFT module; and the selection switch module is specifically configured to receive the analog frequency domain signal by using the configured target input port, and transmit the analog frequency domain signal to the low-speed ADC module by using the output port.

With reference to possible implementation manners of the first aspect, in a seventh possible implementation manner, sampling bandwidth of the low-speed ADC module is not greater than 2 GHz.

With reference to the first aspect and the sixth possible implementation manner of the first aspect, in an eighth possible implementation manner, the control module is specifically configured to: according to a formula $$\begin{cases} N = 1/(f0/fs - x) \\ fs > B \end{cases},$$

configure the sampling rate of the high-speed sampling module and the quantity of points of the East Fourier Transform that are used by the AFFT module for performing time-to-frequency conversion, where fs indicates the sampling rate, N indicates the quantity of points or the Fast Fourier Transform, $N=2^n$, n is an integer greater than 1, N is not greater than M, f0 indicates a center frequency of the received signal, x indicates any natural number, and B indicates the bandwidth of the received signal; and the control module is further specifically configured to: according to a formula $$Bin=(f0-fs*x)/(fs/N),$$

configure the target input port of the selection switch module, where Bin indicates a port number of the target input port, With reference to possible implementation manners of the first aspect, in a ninth possible implementation manner, the receiver further includes a receive antenna, a filtering module, and a gain low noise amplifier LNA module, where:

the receive antenna is connected to the filtering module, the filtering module is connected to the gain LNA module, the gain LNA module is connected to the high-speed sampling module, the receive antenna is configured to receive a radio frequency signal, the filtering module is configured to filter the radio frequency signal, and the gain LNA module is configured to amplify the filtered radio frequency signal to obtain the received signal.

A second aspect of the embodiments of the present disclosure provides a signal processing method, including:
sampling a received signal to obtain a sampled signal;
performing time-to-frequency conversion on the sampled signal to obtain an analog frequency domain signal;
screening the analog frequency domain signal to obtain an analog baseband signal; and
performing analog-to-digital conversion on the analog base)and signal to obtain a digital baseband In a first possible implementation manner of the second aspect, the sampling a received signal to obtain a sampled signal includes:
sampling the received signal according to a specified sampling rate to obtain the sampled signal, With reference to the second aspect and the first possible implementation manner of the second aspect, in a second possible implementation manner, the sampling the received signal according to a specified sampling rate includes:
generating a clock signal with a specified period, where the specified period is equal to a reciprocal of the sampling rate: and
sampling the received signal according to the clock signal.

With reference to the second aspect and the first possible implementation manner of the second aspect, in a third possible implementation manner, the sampling rate is greater than twice of a bandwidth of the received signal.

With reference to the second aspect and the third possible implementation manner, in a fourth possible implementation manner, the sampling rate reaches a GHz magnitude.

With reference to any one of the second aspect, or the first to the fourth possible implementation manners of the second aspect, in a fifth possible implementation manner, the performing time-to-frequency conversion on the sampled signal to obtain an analog frequency domain signal includes:
performing time-to-frequency conversion on the sampled signal by using Fast Fourier Transform, to obtain multiple analog frequency domain signals with different center frequencies.

With reference to the second aspect and the fifth possible implementation manner of the second aspect, in a sixth possible implementation manner, the sampling rate and a quantity of points of the Fast Fourier Transform are determined according to a formula $$\begin{cases} N = 1/(f0/fs - x) \\ fs > B \end{cases},$$

fs indicates the sampling rate. N indicates the quantity of points of the Fast Fourier Transform, $N=2^n$, n is an integer greater than 1, f0 indicates a center frequency of the received signal, x indicates any natural number, and B indicates the bandwidth of the received signal, With reference to the second aspect and the filth possible implementation manner of the second aspect, in a seventh possible implementation manner, the screening the analog frequency domain signal to obtain an analog baseband signal includes:

obtaining, by means of screening, an analog frequency domain signal with a minimum center frequency, and using the analog frequency domain signal with a minimum center frequency as the analog baseband signal.

With reference to possible implementation manners of the second aspect, in an eighth possible implementation manner, before the sampling a received signal to obtain a sampled signal, the method further includes:

receiving a radio frequency signal; filtering the radio frequency signal; and amplifying the filtered radio frequency signal to obtain the received signal.

A third aspect of the embodiments of the present disclosure provides a computer storage medium. The computer storage medium stores a program, and when the program is executed, some or all of the steps of the signal processing method provided in the first aspect are performed.

A fourth aspect of the embodiments of the present disclosure provides a receiver, where the receiver includes an antenna interface, a memory, and a processor. The memory stores a group of program code, and the processor is configured to invoke a program stored in the memory and perform the following operations:

sampling a received signal to obtain a sampled signal;

performing time-to-frequency conversion on the sampled signal to obtain an analog frequency domain signal;

screening the analog frequency domain signal to obtain an analog baseband signal: and performing analog-to-digital conversion on the analog baseband signal to obtain a digital baseband It can be learnt from the foregoing description that the receiver provided in the embodiments of the present disclosure samples a received signal by using a high-speed sampling module, to obtain a sampled signal, and performs time-to-frequency conversion on the sampled signal by using an AFFT module, to obtain an analog frequency domain signal, and finally converts the analog frequency domain signal to a digital baseband signal by using a low-speed ADC module, so as to implement functions of the receiver. Because the receiver provided in the embodiments of the present disclosure does not use a frequency mixer or an I/Q demodulator in a conventional receiver, an operating bandwidth is not limited by channel bandwidth of the frequency mixer or the I/Q demodulator. Channel bandwidth of each of the high-speed sampling module and the AFFT module can reach a GHz magnitude, so that the operating bandwidth of the receiver can reach the GHz magnitude. Because a center frequency of the analog frequency domain signal obtained after the Fast Fourier Transform is not high, a requirement for sampling bandwidth of analog-to-digital conversion is not high (it should be understood that sampling bandwidth may be equal to a center frequency), thereby avoiding using a high-speed ADC. Therefore, the receiver in the embodiments of the present disclosure further has advantages such as low costs and low complexity.

BRIEF DESCRIPTION OF DRAWINGS

To describe the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present: disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

A receiver provided in the embodiments of the present disclosure may be applied to various communications systems, such as: a Global System of Mobile Communications (GSM) system, a Code Division Multiple Access (CDMA) system, a Wideband Code Division Multiple Access (WCDMA) system, a general packet radio service (GPRS), a Long Term Evolution (LTE) system, an LIE frequency division duplex (FDD) system, an LIE time division duplex (TDD), a Universal Mobile Telecommunications System (UMTS), a Worldwide Interoperability for Microwave Access (WiMAX) communications system, a future evolved public land mobile network (PLMN) communications system (5G for short), or the like.

It should be understood that a main function of the receiver is to convert a radio frequency signal on a land, in an ocean, or in the air to a digital baseband signal, so that a subsequent: processing apparatus obtains, by means of demodulation, a wanted signal such as data information or a voice message from the digital baseband signal. The receiver provided in the embodiments of the present disclosure may be built in various receiving devices. The receiving devices include but are not limited to user equipment (UE), a mobile station (MS), a base transceiver station (BTS) in the GSM or the (DMA, a NodeB (NB) in the WCDMA, an evolved NodeB (eNB) in the LTE, or a base station in a 5G network.

Figure 1:
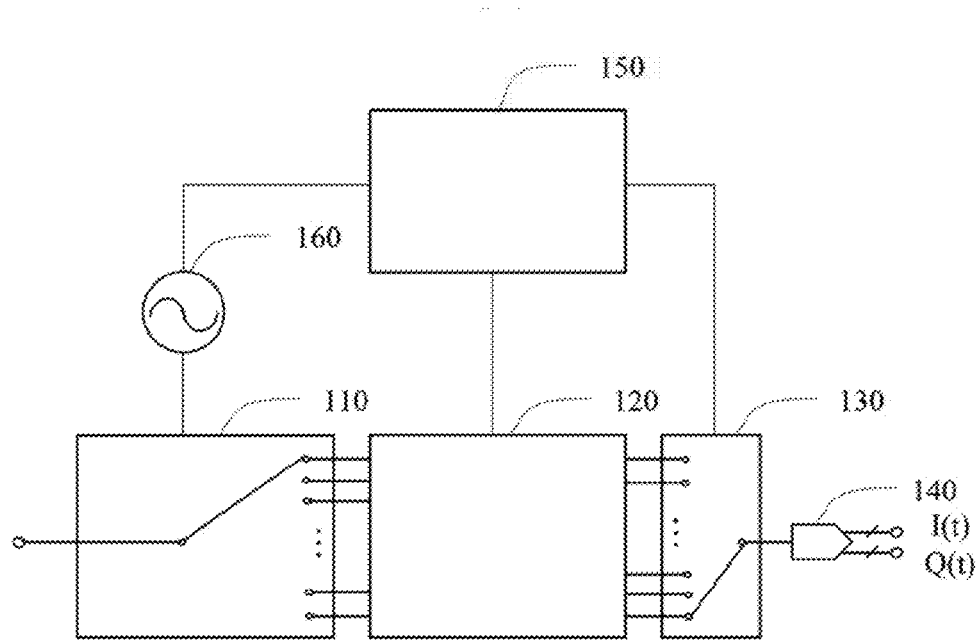
FIG. 1 is a schematic structural diagram of a receiver according to an embodiment of the present disclosure.

FIG. 1 is a schematic structural diagram of a receiver according to an embodiment of the present disclosure. The receiver in this embodiment of the present disclosure shown in the figure may include at least a high-speed sampling module 110, an analog Fast: Fourier Transform AFFT (Analog Fast. Fourier Transform) module 120, a selection switch module 130, a low-speed analog to digital converter ADC (Analog to Digital Converter) module 140, and a control module 150.

The high-speed sampling module 110 is connected to the AFFT module 120, the AFFT module 120 is connected to the selection switch module; 130, the selection, switch module 130 is connected to the low-speed ADC module 140, and the control module 150 is connected to the high-speed sampling module 110, the AFFT module 120, the selection switch module 130, and the low-speed ADC module 140.

The high-speed sampling module 110 is configured to sample a received signal and output a sampled signal to the AFFT module 120. The received signal may be a radio frequency signal received by an antenna, or may be a filtered or amplified radio frequency signal.

In a specific implementation process, the high-speed sampling module 110 includes one input port and M output ports, and M is an integer greater than 2. The high-speed sampling module 110 connects the input port and each output port in turn by means of switching according to a configured sampling rate, to sample received signals, and outputs the obtained sampled signals to the AFFT module 120. It should be understood that, because the input port is connected to each output port in turn by means of switching, the M output ports can only periodically obtain the received signals, in other words, the received signals are sampled. The sampling rate is faster when a connection switching rate is faster. Further, in this embodiment of the present disclosure, signals output from the M output ports are collectively referred to as sampled signals.

It should be noted that the sampling rate is configured and delivered by the control module 150. In addition, the output ports that are connected to the input port in turn by means of switching may be all the output ports, or may be some of the M output ports. Optionally, a quantity of the output ports that are connected to the input port in turn by means of switching are configured and delivered by the control module 150.

Further, optionally, the receiver shown in FIG. 1 further includes a clock module 160. The control module 150 is connected to the high-speed sampling module 110 by using the clock module 160. In a specific implementation process, the clock module 160 sends a clock signal with a specified period to the high-speed sampling module 110, where the specified period is equal to a reciprocal of the sampling rate; the sampling rate is configured and delivered to the clock module 160 by the control module 150, and the high-speed sampling module 110 connects the input port and each output part in turn by means of switching according to the clock signal.

Further, the sampling rate mentioned above should be greater than twice of a bandwidth of the received signal, so as to meet the handpass sampling theorem. In addition, in this embodiment of the present disclosure, an upper limit of the sampling rate is not less than 6 GHz, that is, bandwidth of 6 GHz can be supported at least, and 6 GHz is a core frequency of the 5G network. It should be further understood that the high-speed sampling module 110 is only configured to perform sampling. Therefore, a hardware structure of the high-speed sampling module 110 is simple, and even if the sampling rate of the high-speed sampling module 110 is increased to a GHz magnitude (the "GHz magnitude" in this embodiment of the present disclosure refers to "a frequency greater than 1 GHz", such as 6 GHz, and details are not described in the following), costs and complexity are not increased obviously. The ADC module is configured to perform not only sampling but also analog-to-digital conversion. Therefore, a hardware structure (such as a circuit structure) of the ADC module is much more complex than that of the high-speed sampling module 110, and as a result, an increasing sampling frequency of the ADC module obviously increases the costs and the complexity. Therefore, in this embodiment of the present disclosure, the high-speed sampling module 110 is selected to sample the received signal, so that the receiver has advantages such as low costs and low complexity.

The AFFT module 120 is configured to perform time-to-frequency conversion on the sampled signal and output an analog frequency domain signal to the selection switch module 130.

In a specific implementation process, the AFFT module 120 includes M input ports and M output ports. The M input ports of the AFFT module 120 are respectively connected to the M output ports of the high-speed sampling module 110. The AFFT module 120 performs, according to a configured quantity of points of the Fast Fourier Transform, time-to-frequency conversion on the sampled signal input from the input port of the AFFT module 120; and outputs, by using the output port of the AFFT module 120, the analog frequency domain signal obtained after the time-to-frequency conversion to the selection switch module. The analog frequency domain signal refers to an analog signal in a frequency domain (Frequency). More specifically, correspondingly, when the output ports of the high-speed sampling module 110 periodically sample the received signals and output the sampled signals, the input ports of the AFFT module 120 also periodically receive the sampled signals, and perform time-to-frequency conversion on the sampled signals received on the multiple input ports in each period. It should he understood that the time-to-frequency conversion in this embodiment of the present disclosure is the Fast Fourier Transform (FFT). For example, it is assumed that a vector expression of the input sampled signals is $X=[x_1(t), x_2(t), x_3(t), \ldots, x_N(t)]$, and $x_N(t)$ is a time-domain signal input from the input port N of the AFFT module 120, $N=2^n$, n is an integer greater than 1, and N is not greater than M; after the Fast Fourier Transform is performed on X, an obtained vector is $Y=[y_1(n), y_2(n), y_3(n), \ldots, y_N(n)]$, and $y_N(n)$ is a frequency-domain signal output from the input port N of the AFFT module 120. Because all the foregoing processes are linear conversion, no loss is caused to a dynamic range of the receiver. The dynamic range refers to a size range of an input signal, where within the size range, the receiver detects the received signal and the received signal is undistorted. An overlarge dynamic range may result in noise, and if a dynamic range of an input signal is excessively small, the input signal cannot be detected.

It should be noted that the quantity of points of the Fast Fourier Transform is configured and delivered by the control module 150, so as to ensure that the AFFT module 120 obtains a correct sampled signal and outputs a correct analog frequency domain signal. For example, it is assumed that M=10, and $N=2^3=8$ is configured. The AFFT module 120 receives sampled signals by using only the first to the eighth input ports, and outputs analog frequency domain signals by using the first to the eighth output ports. The two remaining input ports of the AFFT module 120 do not receive a sampled signal. The reason why the two remaining input ports may not receive a sampled signal is as follows: Received signals are continuous, and when a total quantity of sampling points is enough, discarding some sampling points does not impose great impact on an output result of the entire receiver.

The AFFT module 120 in this embodiment of the present disclosure is configured to implement the Fast Fourier Transform and features a simple structure and low costs. In addition, channel bandwidth of the AFFT module 120 may reach the GHz magnitude.

The receiver in this embodiment of the present disclosure does not use a frequency mixer or an I/Q demodulator in a conventional receiver and overcomes a problem that an operating bandwidth is limited by the frequency mixer or the I/Q demodulator. In addition, channel bandwidth of each of a high-speed sampling module 110 and an AFFT module 120 can reach a GHz magnitude, so that an operating bandwidth of the receiver can reach the GHz magnitude. In addition, because phase noise of the frequency mixer may result in decreasing of received signal quality, a noise reduction circuit needs to be added to perform noise reduction processing; as a result, an architecture is complex, and hardware has a lame volume. Because problems such as carrier leakage and direct current imbalance leakage of the I/Q demodulator results in a loss of a dynamic range, a leakage prevention circuit needs to be added to perform leakage prevention processing; as a result, the architecture is complex, and the hardware has a large volume. However, there is no need to perform noise reduction processing and leakage prevention processing for the high-speed sampling module 110 and the AFFT module 120, so that an architecture of the receiver can be simplified, and the hardware volume can be reduced.

The selection switch module 130 is configured to transmit the analog frequency domain signal to the low-speed ADC module 140.

In a specific implementation process, the selection switch module 130 includes M input ports and one output port; the M input ports of the selection switch module are respectively connected to the M output ports of the AFFT module 120; the selection switch module 130 receives the analog frequency domain signal by using a configured target input port, and transmits the analog frequency domain signal to the low-speed ADC module by using the output port; and the target input port is one of the input ports of the selection switch module 130.

It should be noted that a port number of the target input port is configured and delivered by the control module 150, so as to ensure that the low-speed ADC module 140 obtains an optimal analog frequency domain signal. The optimal analog frequency domain signal is an analog frequency domain signal with a minimum center frequency. Specifically, after performing the Fast Fourier Transform on the sampled signal, the AFFT module 120 obtains and outputs N analog frequency domain signals with different center frequencies. A smaller center frequency of an analog frequency domain signal indicates smaller sampling bandwidth of the low-speed ADC module 140 (sampling bandwidth of an analog to digital convener is an operating bandwidth for completing the analog-to-digital conversion), thereby leading to lower costs and complexity of the low-speed ADC module 140. Therefore, the selection switch module 130 needs to receive the analog frequency domain signal with the minimum center frequency according to the configured target input port, for example, among A analog frequency domain signals output by the AFFT module 120, a center frequency of one analog frequency domain signal is zero (that is, a zero-.F signal, the zero-IF signal has a minimum center frequency). It is assumed that the analog frequency domain signal is output from the second output port of the AFFT module 120 to the second input port of the selection switch module 130, the configured target input port is the second input port of the selection switch module 130, and the selection switch module 130 receives the analog frequency domain signal by using the target input port and transmits the analog frequency domain signal to the low-speed ADC module 140.

Figure 6:
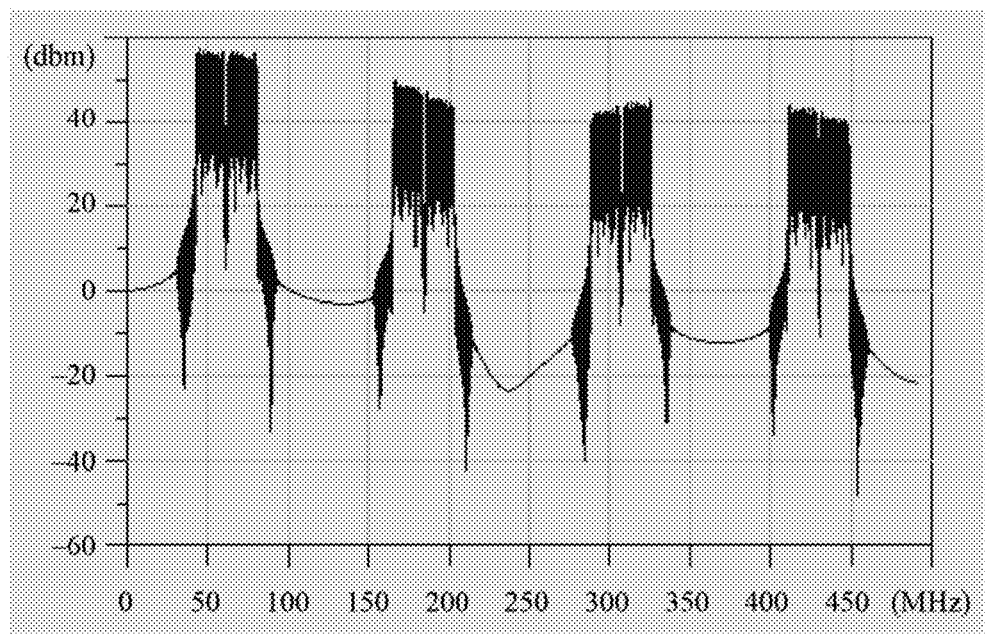
FIG. 6 is a schematic diagram of simulation of a sampled signal according to an embodiment of the present disclosure.
Figure 7:
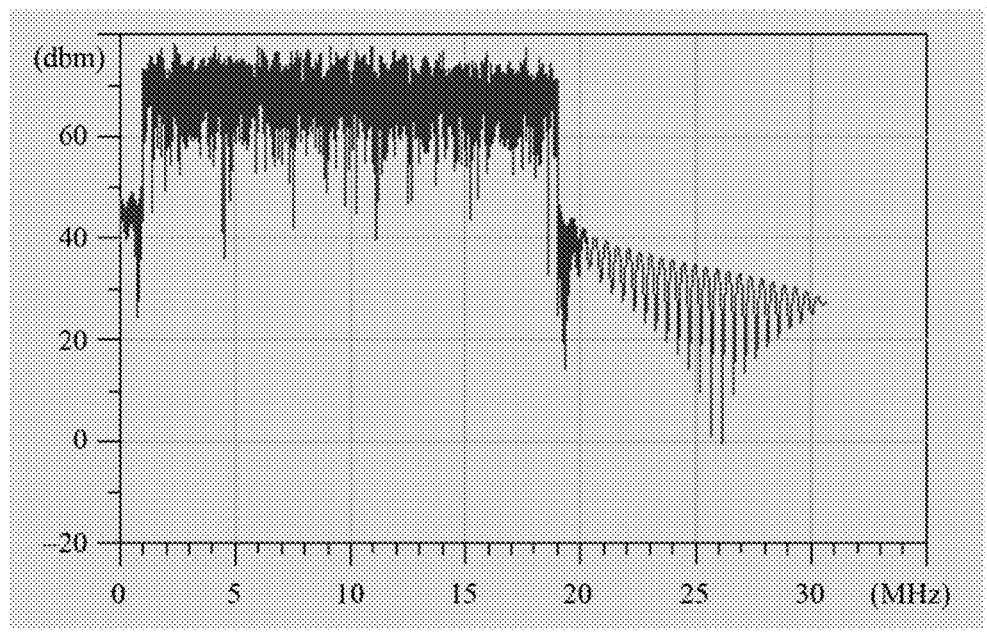
FIG. 7 is a schematic diagram of simulation of an analog frequency domain signal according to an embodiment of the present disclosure.

It should be further noted that all the N analog frequency domain signals output by the AFFT module 120 carry complete useful information (data information or a voice message):, and therefore, only one optimal analog frequency domain signal needs to be selected and transmitted to the low-speed ADC module 140, and other analog frequency domain signals are discarded. The following briefly describes the reason why all the N analog frequency domain signals output by the AFFT module 120 carry complete useful information: Sampled signals received on the first to the $N^{th}$ input ports of the AFFT module 120 are actually N sampled pulses. Each sampled pulse includes, a fundamental wave and a harmonic. For ease of understanding, the fundamental wave and the harmonic in each sampled pulse are expressed in a signal form, for example, the $k^{th}$ sampled signal may he expressed by x(k)=a(k)+j*b(k). It is assumed that a formula for the AFFT module 120 to perform the Fourier Transform is as follows:

$$Y(n) = \sum_{k=0}^{N-1} x(k)e^{\frac{j2\pi kn}{N}}, 0 \le k \le N-1;$$

an analog frequency domain signal output front the $n^{th}$ output port of the AFFT module 120 is Y(n); Obviously, Y(n) includes x(l) to x(N), that is Y(n) includes a(l)+j*b(l) to a(N)+j*b(N), in other words, an analog frequency domain signal output from any output port of the AFFT module 120 carries fundamental waves and harmonics of sampled pulses received on the first to the $N^{th}$ input ports of the AFFT module 120. For example, it is assumed that N=8 and n=1, that is, the AFFT module has eight input ports and eight output ports; and an analog frequency domain signal output from the first output port is $$Y(1) = x(1)e^{\frac{j2n}{8}} + x(2)e^{\frac{j4n}{8}} + \ldots x(8)e^{\frac{j16n}{8}},$$

and it can be learnt that the analog frequency domain signal output from the first: output port carries fundamental waves and harmonics of sampled pulses on the eight input ports. Therefore, it is easy to obtain that all the N analog frequency domain signals output by the AFFT module 120 carry the complete useful information. To verify accuracy of the foregoing inference, in this embodiment of the present disclosure, simulation is performed on input and output of the AFFT module 120. Refer to FIG. 6, a pulse signal in FIG. 6 is a sampled pulse received on an input port of the AFFT module 120, and it can be learnt that each sampled pulse includes a fundamental wave and a harmonic. Refer to FIG. 7, a signal in FIG. 7 is the analog frequency domain signal output from the first output port of the AFFT module 120, and it can be learnt that the analog signal carries information about sampled pulses received on all the input ports.

it should he further noted that, after performing the Fast Fourier Transform on the sampled signal, the AFFT module 120 obtains N analog frequency domain signals with different center frequencies. There is at least one analog frequency domain signal whose center frequency is less than a center frequency of the original received signal. Because the selection switch module 130 selects and receives the analog frequency domain signal with the minimum center frequency, the center frequency of the analog frequency domain signal is less than the center frequency of the original received signal. It can he learnt that the AFFT module 120 and the selection switch module 130 implement spectrum shifting of the original received signal, and the analog frequency domain signal is, an analog baseband. It should be understood that a frequency mixer and an I/Q demodulator in a conventional receiver respectively function to perform frequency mixing and frequency conversion, so as to implement spectrum shifting. Therefore, in this embodiment of the present disclosure, the high-speed sampling module 110, the AFFT module 120, and the selection switch module 130 may replace the frequency mixer or the demodulator in the conventional receiver. This is the reason why the receiver does not use the frequency mixer or the I/Q demodulator. Specially, implementing frequency conversion and spectrum shilling based on the AFFT according to this embodiment of the present disclosure may greatly simplify complexity of the receiver and reduce costs.

The low-speed ADC module 140 is configured to convert the analog frequency domain signal to a digital baseband signal.

Further, the converted digital signal is divided into a real part I (t) and an imaginary part Q (t) and is output to a subsequent processing apparatus, and the processing apparatus obtains, by means of demodulation, a wanted signal such as data information or a voice message from the digital baseband signal.

According to this embodiment of the present disclosure, time-to-frequency conversion is performed on the sampled signal by using the AFFT module 120, and the sampled signal may be converted from a time domain to a frequency domain. Because a signal processing speed in the frequency domain is faster than that in the time domain, an operating rate of the receiver is improved. In addition, spectrum shifting is further performed on the sampled signal in the time-to-frequency conversion process to obtain multiple analog frequency domain signals with different center frequencies. The analog frequency domain signal with the minimum center frequency is selected from the multiple analog frequency domain signals by using the selection switch module 130. An analog frequency domain signal with a low center frequency imposes a low requirement on sampling bandwidth of analog-to-digital conversion (it should he understood that the sampling bandwidth may be equal to the center frequency), thereby avoiding using a high-speed ADC. Optionally, the sampling bandwidth of the low-speed ADC module 140 in this embodiment of the present disclosure is less than 2 GHz. 2 GHz may be considered as a critical value. If sampling bandwidth exceeds 2 GHz, costs and complexity of an ADC are high.

The control module 150 is configured to perform configuration on a sampling rate of the high-speed sampling module 110, a quantity of points of Fast Fourier Transform that are used by the AFFT module 120 for performing time-to-frequency conversion, and a target input port of the selection switch module 130.

In a specific implementation process, the control module 150 configures, according to formula (1)

$$\begin{cases} N = 1/(f0/fs - x) \\ fs > B \end{cases} \quad (1)$$

the sampling rate of the high-speed sampling module 110 and the quantity of points of the Fast Fourier Transform that are used by the AFFT module 120 for performing, time-to-frequency conversion, where fs indicates the sampling rate, N indicates the quantity of points of the Fast Fourier. Transform, $N=2^n$, n is an integer greater than 1, N is not greater than M, f0 indicates the center frequency of the received signal, x indicates any natural number, and B indicates the bandwidth of the received signal. It should be noted that "N=1/(f0/fs−x)" in the formula indicates that the center frequency of the received signal needs to be in the xth Nyquist domain and on the point of the $N^{th}$ Fast Fourier Transform, so as to ensure accuracy of the Fast Fourier Transform; and "fs>B" in the formula indicates that the sampling rate needs to be greater than the bandwidth of the received signal.

In the formula (1), f0 and B and are parameters preconfigured in a system and are known by the control module 150 by default and fs, N, and x are unknown. The control module 150 obtains the unknown fs, N, and x by means of calculation according to the equation and the inequality in the formula (1). Further, if the obtained fs, N, and x have multiple groups of results, a group of results with minimum fs is selected because in a condition of fs>B, if fs is smaller, complexity of the high-speed sampling module 110 is lower, and the receiver is more easily to implement.

The control module 150 further configures, according to formula (2)

$$\text{Bin}=(f0-fs*x)/(fs/N) \quad (2),$$

the target input port of the selection switch module 130, where Bin indicates the port number of the target input port. It should be noted that, in this embodiment of the present disclosure, port numbers of the input ports of the selection switch module 130 are identified in advance, for example, the first to the $N^{th}$ input ports of the selection switch module 130 are identified in advance by using the first to the $N^{th}$ port numbers respectively. It should be further noted that, a center frequency of a received analog frequency domain signal corresponding to the port number obtained according to the formula (2) is the smallest compared with other ports, For example, if f0=1.9 GHz and B=40 MHz, fs=0.304 GHz, N=1, x=6, and Bin=1 are obtained by means of calculation. For another example, if f0=2.25 GHz and B=1 GHz, fs=1.5 GHz, N=2, x=1, and Bin=1 are obtained by means of calculation.

Further, the control module 150 further configures fs to the high-speed sampling module 110 or the clock module 160; configures N points of the Fast Fourier Transform to the AFFT module 120; and configures Bin to the selection switch module 130.

It can be learnt from the foregoing description that the receiver provided in this embodiment of the present disclosure samples a received signal by using a high-speed sampling module, to obtain a sampled signal, and performs time-to-frequency conversion on the sampled signal by using an AFFT module, to obtain an analog frequency domain signal, and finally converts the analog frequency domain signal to a digital baseband signal by using a low-speed ADC module, so as to implement functions of the receiver. Because the receiver provided in this embodiment of the present disclosure does not use a frequency mixer or an I/Q demodulator in, a conventional receiver, an operating bandwidth is not limited by channel bandwidth of the frequency mixer or the I/Q demodulator. Channel bandwidth of each of the high-speed sampling module and the AFFT module can reach a GHz magnitude, so that the operating bandwidth of the receiver can reach the GHz magnitude. Because a center frequency of the analog frequency domain signal obtained after the Fast Fourier Transform is not high, a requirement for sampling bandwidth of analog-to-digital conversion is not high (it should be understood that sampling bandwidth may be equal to a center frequency), thereby avoiding using a high-speed ADC. Therefore, the receiver in this embodiment of the present disclosure further has advantages such as low costs and low complexity.

Figure 2:
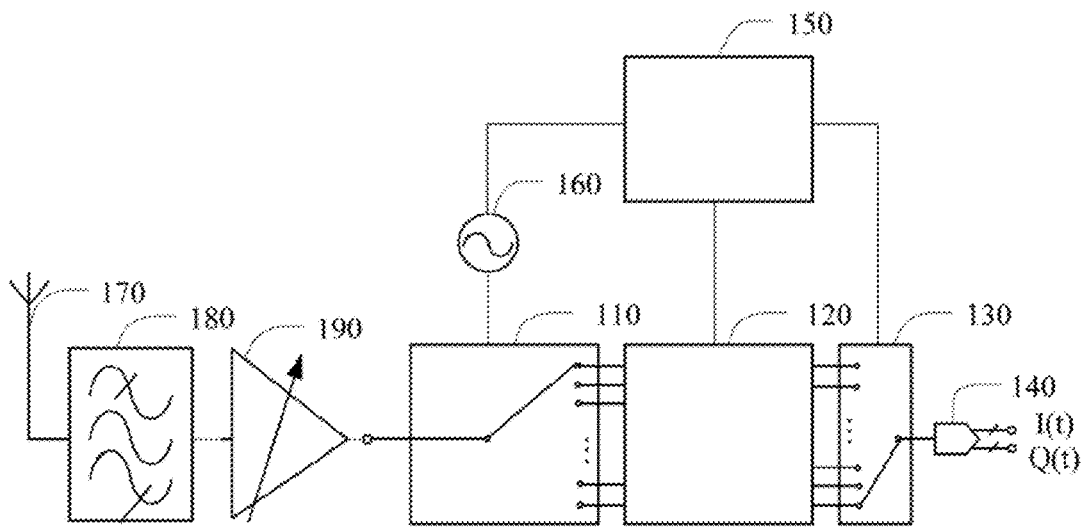
FIG. 2 is a schematic structural diagram of another receiver according to an embodiment of the present disclosure.

FIG. 2 is a schematic structural diagram of another receiver according to an embodiment of the present disclosure. The receiver shown in this embodiment of the present disclosure shown in the figure includes at least a high-speed sampling module 110, an analog Fast Fourier Transform AFFT module 120, a selection switch module 130, a low-speed analog to digital converter ADC module 140, a control module 150, a clock module 160, a receive antenna 170, a filtering module 180, and a low noise amplifier LNA (Low Noise Amplifier) module 190.

The receive antenna 170 is connected to the filtering module 180, the filtering module 180 is connected to the LNA module 190, the LNA module 190 is connected to the high-speed sampling module 110, the high-speed sampling module 110 is connected to the AFFT module 120, the AFFT module 120 is connected to the selection switch module 130, the selection switch module 130 is connected to the low-speed ADC module 140, and the control module 150 is connected to the high-speed sampling module 110, the AFFT module 120, the selection switch module 130, and the low-speed ADC module 140. Further, the control module 150 is connected to the high-speed sampling module 110 by using the clock module 160.

The receive antenna 170 is configured to receive a radio frequency signal on a land, in an ocean, or in the air.

The filtering module 180 is configured to filter the radio frequency signal, so as to filter out an unwanted signal such as a spurious wave or an interference signal. In this embodiment of the present disclosure, the filtering module 180 is a handpass filter.

The LNA module 190 is configured to amplify the filtered radio frequency signal to obtain a received signal, that is, amplify the radio frequency signal to a detectable level. Optionally, the LNA module 190 may he specifically a gain LNA circuit.

In specific implementation, when the radio frequency signal received by the receive antenna 170 is a continuous broadband signal, bandwidth of the filtered radio frequency signal output by the filtering module 180 is maintained to B. Channel bandwidth of the LNA module 190 is greater than B, the LNA module 190 amplifies a level of the filtered radio frequency signal to a level that can he detected by the high-speed sampling module 110, and the amplified signal is the received signal, The high-speed sampling module 110 is configured to sample the received signal and output a sampled signal to the AFFT module 120.

The clock module 160 is configured to send a clock signal with a specified period to the high-speed sampling module 110, where the specified period is equal to a reciprocal of a sampling rate, and the sampling rate is configured and delivered to the clock module 160 by the control module 150. Correspondingly, the high-speed sampling module 110 connects an input port and each output port in turn by means of switching according to the clock signal.

The AFFT module 120 is configured to perform time-to-frequency conversion on the sampled signal and output an analog frequency domain signal to the selection switch module 130.

The selection switch module 130 is conformed to transmit the analog frequency domain signal to the low-speed ADC module 140.

The low-speed ADC module 140 is configured to convert the analog frequency domain signal to a digital baseband signal.

The control module 150 is configured to perform configuration on the sampling rate of the high-speed sampling module 110, a quantity of points of Fast Fourier Transform that are used by the AFFT module 120 for performing time-to-frequency conversion, and a target input port of the selection switch module 130.

in conclusion, a signal flow trend of the receiver provided in this embodiment of the present disclosure may be summarized in the following: (1) analog radio frequency signal → (2) analog sampled signal → (3) analog frequency domain signal → (4) analog baseband signal → (5) digital baseband signal. It can be learnt that, signal processing of the receiver is concentrated on an analog domain (that is, (1) to (4) are all the analog domain). The receiver. Shown in this embodiment of the present disclosure may mainly work in the analog domain, so as to convert the radio frequency signal to the digital baseband.

The receiver provided in this embodiment of the present disclosure samples a received signal by using a high-speed sampling module, to obtain a sampled signal, and performs time-to-frequency conversion on the sampled signal by using an AFFT module, to obtain an analog frequency domain signal, and finally converts the analog frequency domain signal to a digital baseband signal by using a low-speed ADC module, so as to implement: functions of the receiver. Because the receiver provided in this embodiment of the present disclosure does not use a frequency mixer or an I/Q demodulator in a conventional receiver, an operating bandwidth is not limited by channel bandwidth of the frequency mixer or the I/Q demodulator. Channel bandwidth of each of the high-speed sampling module and the AFFT module can reach a GHz magnitude, so that the operating bandwidth of the receiver can reach the GHz magnitude. Because a center frequency of the analog frequency domain signal obtained after the Fast Fourier Transform is not high, a requirement for sampling bandwidth of analog-to-digital conversion is not high (it should be understood that sampling bandwidth may be equal to a center frequency), thereby avoiding using a high-speed ADC. Therefore, the receiver in this embodiment of the present disclosure farther has advantages such as low costs and low complexity.

Figure 3:
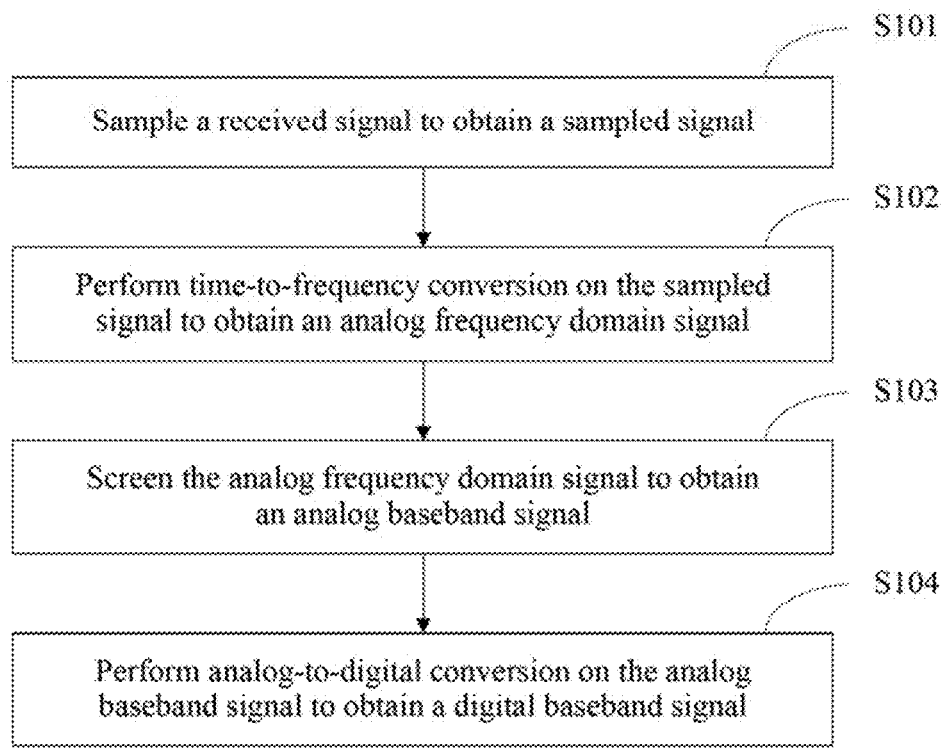
FIG. 3 is a schematic flowchart of a signal processing method according to an embodiment of the present disclosure.

FIG. 3 is a schematic flowchart of a signal processing method according to an embodiment of the present disclosure, and the method may include:

S101. Sample a received signal to obtain a sampled signal.

Specifically, a receiver samples the received signal according to a specified sampling rate to obtain the sampled signal. The received signal may be a radio frequency signal received by an antenna, or may be a filtered or amplified radio frequency signal.

Optionally, the receiver first generates a clock signal with a specified period, where the specified period is equal to a reciprocal of the sampling rate; and then samples the received signal according, to the clock signal.

Further, the sampling rate mentioned above should be greater than twice of a bandwidth of the received signal, so as to meet the bandpass sampling theorem. In addition, in this embodiment of the present disclosure, an upper limit of the sampling rate is not less than 6 GHz, that is, bandwidth of 6 GHz can be supported at least.

Further, the sampling rate is determined according to formula (1), fs indicates the sampling rate, N indicates the quantity of points of Fast Fourier Transform, N=2$^n$, n is an integer greater than 1, f0 indicates a center frequency of the received signal, x indicates any natural number, and B indicates bandwidth of the received signal.

Further, optionally, before sampling the received signal, the receiver receives a radio frequency signal, filters the radio frequency signal, and amplifies the filtered radio frequency signal to obtain the received signal.

S102. Perform time-to-frequency conversion on the sampled signal to obtain an analog frequency domain signal.

Specifically, the receiver performs time-to-frequency conversion on the sampled signal by means of the Fast Fourier Transform, to obtain multiple analog frequency domain signals with different center frequencies.

It should be understood that, the time-to-frequency conversion in this embodiment of the present disclosure is the Fast Fourier Transform. Because the process is linear conversion, no loss is caused to a dynamic range of the receiver. Me dynamic range refers to a size range of an input signal, where within the size range, the receiver detects the received signal and the received signal is undistorted. An overlarge dynamic range may result in distortion and noise, and if a dynamic range of an input signal is excessively small, the input signal cannot be detected.

Further, the quantity of points of the Fast Fourier Transform is also determined according to formula (1).

S103. Screen the analog frequency domain signal to obtain an analog baseband

Specifically, the receiver selects an analog frequency domain signal with a minimum center frequency as the analog baseband signal.

It should be noted that all the multiple analog frequency domain signals obtained in step S102 carry complete useful information data information or a voice message); and therefore, only one optimal analog frequency domain signal needs to be selected as the analog baseband signal, and other analog frequency domain signals may be discarded. The reason why all the multiple analog frequency domain signals carry the complete useful information is described above, and details are not described herein.

It should be further noted that, a center frequency of the analog baseband signal selected from the multiple analog frequency domain signals is less than a center frequency of the original received signal. Farther, a center frequency of the selected analog baseband signal may be a zero frequency. It can be learnt that the receiver implements spectrum shifting of the original received signal.

S104. Perform analog-to-digital conversion on the analog baseband signal to obtain a digital baseband signal.

Further, the converted digital signal is divided into a real part I (t) and an imaginary part Q (t) and is output to a subsequent processing apparatus, and the processing apparatus obtains, by means of demodulation, a wanted signal such as data information or a voice message from the digital baseband signal.

Figure 4:
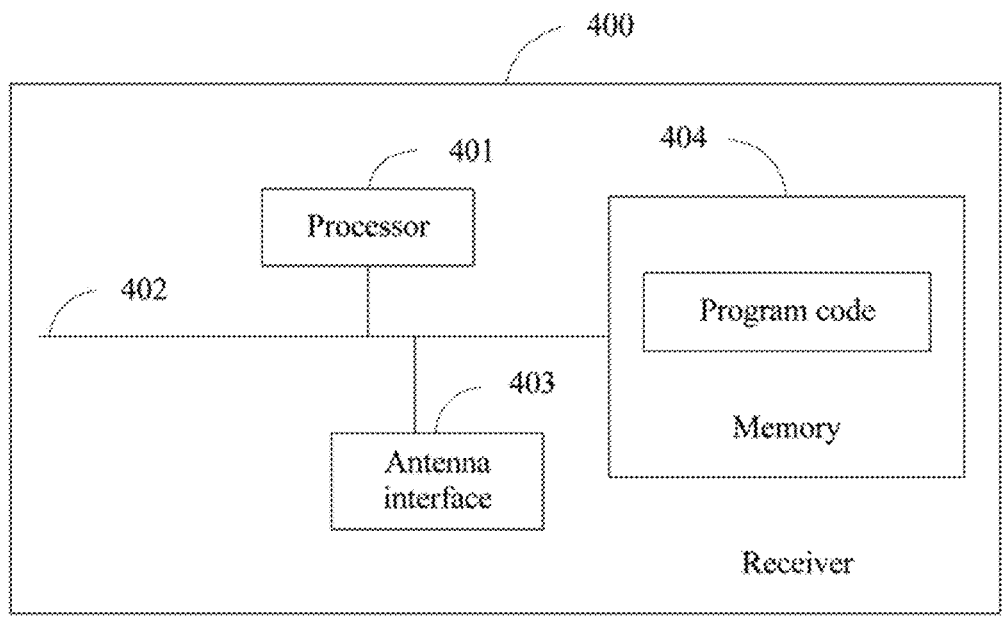
FIG. 4 is a schematic structural diagram of another receiver according to an embodiment of the present disclosure.
Figure 5:
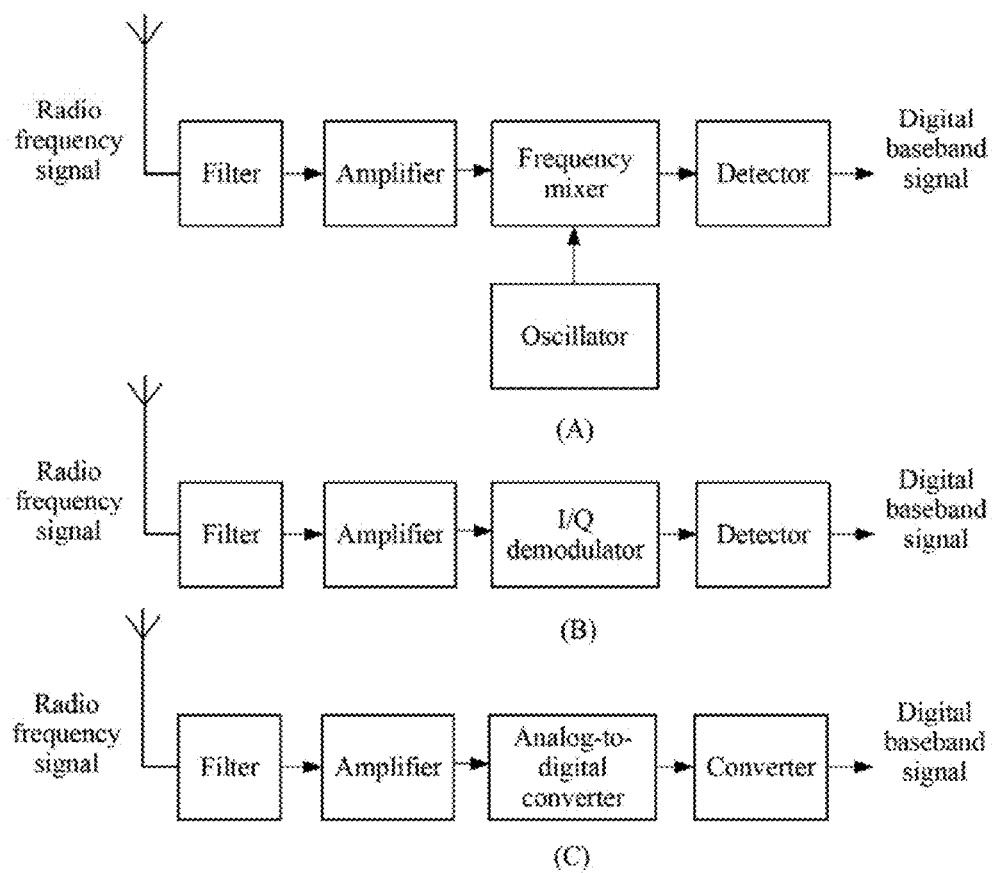
FIG. 5 is a schematic structural diagram of an existing receiver according to an embodiment of the present disclosure.

FIG. 4 is a schematic structural diagram of another receiver according to an embodiment of the present disclosure. As shown in FIG. 4, the receiver may include at least one processor 401, such as a CPU, at least one antenna interface 403, a memory 404, and at least one communications bus 402. The communications bus 402 is configured to implement connection and communication between these components. The antenna interface 403 in this embodiment of the present disclosure is configured to receive a radio frequency signal. The memory 404 may be a high-speed RAM memory, or may be a non-volatile memory (non-volatile memory) such as at least one magnetic disk memory. Optionally, the memory 404 may further be at least one storage apparatus that is away from the processor 401. The memory 404 stores a group of program code, and the processor 401 is configured to invoke the program code stored in the memory 404 and perform the following operations:

sampling a received signal to obtain a sampled signal;

performing time-to-frequency conversion on the sampled signal to obtain an analog frequency domain signal;

screening the analog frequency domain signal to obtain an analog baseband signal; and performing analog-to-digital conversion on the analog baseband signal to obtain a digital baseband signal.

Optionally, a specific operation in which the processor 401 samples the received signal to obtain the sampled signal is:

sampling the received signal according to a specified sampling rate to obtain the sampled signal.

Further, a specific operation in which the processor 401 samples the received signal according to the specified sampling rate is:

generating a clock signal with a specified period, where the specified period is equal to a reciprocal of the sampling rate; and sampling the received signal according to the clock signal.

Optionally, the sampling rate is greater than twice of a bandwidth of the received signal.

Further, the sampling rate reaches a GHz magnitude.

Optionally, a specific operation in which the processor 401 performs time-to-frequency conversion on die sampled signal to, obtain the analog frequency domain signal may be:

performing time-to-frequency conversion on the sampled signal by using Fast Fourier Transform, to obtain multiple analog frequency domain signals with different center frequencies.

Correspondingly, the sampling rate and a quantity of points of the Fast Fourier Transform are determined according to a formula $$\begin{cases} N = 1/(f0/fs - x) \\ fs > B \end{cases},$$

fs indicates the sampling rate, N indicates the quantity of points of the Fast Fourier Transform, N=2$^n$, n is an integer greater than 1, f0 indicates a center frequency of the received signal, x indicates any natural number, and B indicates the bandwidth of the received signal.

Optionally, a specific operation in which the processor 401 screens the analog frequency domain signal to obtain the analog baseband signal is:

selecting an analog frequency domain signal with a minimum center frequency as the analog baseband signal.

Further, optionally, before sampling the received signal to obtain the sampled signal, the processor 401 further performs the following operations:

receiving a radio frequency signal; filtering the radio frequency signal; and amplifying the filtered radio frequency signal to obtain the received signal.

The embodiments of the present disclosure further provide a computer storage medium, where the computer storage medium stores a program, and the program includes instructions that are used to perform some or all of steps of the signal processing method described in FIG. 3 of the embodiments of the present disclosure.

It can be learnt from the foregoing description that the receiver provided in the embodiments of the present disclosure samples a received signal by using a high-speed sampling module, to obtain a sampled signal, and performs time-to-frequency conversion on the sampled signal by using an AFFT module, to obtain an analog frequency domain signal, and finally converts the analog frequency domain signal to a digital baseband signal by using a low-speed ADC module, so as to implement functions of the receiver. Because the receiver provided in the embodiments of the present disclosure does not use a frequency mixer or an I/Q demodulator in a conventional receiver, an operating bandwidth is not limited by channel bandwidth of the frequency mixer or the I/Q demodulator. Channel bandwidth of each of the high-speed sampling module and the AFFT module can reach a GHz magnitude, so that the operating bandwidth of the receiver can reach the GHz magnitude. Because a center frequency of the analog frequency domain signal obtained after the Fast Fourier Transform is not high, a requirement for sampling bandwidth of analog-to-digital conversion is not high (it should be understood that sampling bandwidth may be equal to a center frequency), thereby avoiding using a high-speed ADC. Therefore, the receiver in the embodiments of the present disclosure further has advantages such as low costs and low complexity.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely examples of the embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A receiver, wherein the receiver comprises:
a high-speed sampler;
an analog Fast Fourier Transform (AFFT) converter;
a selection switch;
a low-speed analog to digital converter (ADC); and
a controller, wherein:
the high-speed sampler is connected to the AFFT converter, the AFFT converter is connected to the selection switch, the selection switch is connected to the low-speed ADC converter, and the controller is connected to the high-speed sampler, the AFFT converter, the selection switch, and the low-speed ADC; and
the high-speed sampler is configured to sample a received signal and output a sampled signal to the AFFT converter; the AFFT converter is configured to perform time-to-frequency conversion on the sampled signal and output an analog frequency domain signal to the selection switch; the selection switch is configured to transmit the analog frequency domain signal to the low-speed ADC; the low-speed ADC is configured to convert the analog frequency domain signal to a digital baseband signal; and the controller is configured to perform configuration on a sampling rate of the high-speed sampler, a quantity of points of Fast Fourier Transform that are used by the AFFT converter to perform time-to-frequency conversion, and a target input port of the selection switch;
wherein the high-speed sampler comprises one input port and M output ports, wherein M is an integer greater than 2; and
the high-speed sampler is configured to connect the input port and each output port in turn by switching according to the configured sampling rate, to sample the received signal, and output the obtained sampled signal to the AFFT converter.

2. The receiver according to claim 1, wherein the receiver further comprises a clock, and the controller is connected to the high-speed sampler by using the clock;
the clock is configured to send a clock signal with a specified period to the high-speed sampler, wherein the specified period is equal to a reciprocal of the sampling rate; and
the high-speed sampler is configured to connect the input port and each output port in turn by switching according to the clock signal.

3. The receiver according to claim 1, wherein the sampling rate is greater than twice of a bandwidth of the received signal.

4. The receiver according to claim 3, wherein the sampling rate reaches a GHz magnitude.

5. The receiver according to claim 1, wherein the AFFT converter comprises M input ports and M output ports, wherein the M input ports of the AFFT converter are respectively connected to the M output ports of the high-speed sampler; and
the AFFT converter is configured to perform, by the Fast Fourier Transform, time-to-frequency conversion on the sampled signal input from the input port, and output, by using the output port, the analog frequency domain signal obtained after time-to-frequency conversion to the selection switch.

6. The receiver according to claim 5, wherein the selection switch comprises M input ports and one output port; the target input port of the selection switch is one of the M input ports; the M input ports of the selection switch are respectively connected to the M output ports of the AFFT converter; and the selection switch is configured to receive the analog frequency domain signal by using the configured target input port, and transmit the analog frequency domain signal to the low-speed ADC using the output port.

7. The receiver according to claim 1, wherein sampling bandwidth of the low-speed ADC is not greater than 2 GHz.

8. The receiver according to claim 6, wherein the controller is configured to: according to a formula $$\begin{cases} N = 1/(f0/fs - x) \\ fs > B \end{cases},$$

configure the sampling rate of the high-speed sampler and the quantity of points of the Fast Fourier Transform that are used by the AFFT converter for performing time-to-frequency conversion, wherein fs indicates the sampling rate, N indicates the quantity of points of the Fast Fourier Transform, $N=2^n$, n is an integer greater than 1, N is not greater than M, f0 indicates a center frequency of the received signal, x indicates any natural number, and B indicates the bandwidth of the received signal; and the controller is further configured to: according to a formula $Bin=(f0-fs*x)/(fs/N)$, configure the target input port of the selection switch, wherein Bin indicates a port number of the target input port.

9. The receiver according to claim 1, wherein the receiver further comprises a receive antenna, a filter, and a gain low noise amplifier (LNA), wherein:
the receive antenna is connected to the filter, the filter is connected to the gain LNA, the gain LNA is connected to the high-speed sampler, the receive antenna is configured to receive a radio frequency signal, the filter is configured to filter the radio frequency signal, and the gain LNA is configured to amplify the filtered radio frequency signal to obtain the received signal.

10. A method for obtaining a digital baseband signal, comprisinq:
sampling the received signal according to a specified sampling rate to obtain the sampled signal;
performing time-to-frequency conversion on the sampled signal by using Fast Fourier Transform, to obtain multiple analog frequency domain signals with different center frequencies;
obtaining, by screening, an analog frequency domain signal with a minimum center frequency, and using the analog frequency domain signal with a minimum center frequency as the analog baseband signal; and
performing analog-to-digital conversion on the analog baseband signal to obtain a digital baseband signal.

11. The method according to claim 10, wherein the sampling the received signal according to a specified sampling rate comprises:
generating a clock signal with a specified period, wherein the specified period is equal to a reciprocal of the sampling rate; and
sampling the received signal according to the clock signal.

12. The method according to claim 10, wherein the sampling rate is greater than twice of a bandwidth of the received signal.

13. The method according to claim 12, wherein the sampling rate reaches a GHz magnitude.

14. The method according to claim 10, wherein the sampling rate and a quantity of points of the Fast Fourier Transform are determined according to a formula $$\begin{cases} N = 1/(f0/fs - x) \\ fs > B \end{cases},$$

fs indicates the sampling rate, N indicates the quantity of points of the Fast Fourier Transform, $N=2^n$, n is an integer greater than 1, f0 indicates a center frequency of the received signal, x indicates any natural number, and B indicates the bandwidth of the received signal.

15. The method according to claim 10, wherein:
the performing time-to-frequency conversion on the sampled signal is implemented by using analog Fast Fourier Transform (AFFT).

* * * * *

UNITED STATES PATENT AND TRADEMARK OFFICE
CERTIFICATE OF CORRECTION

PATENT NO. : 10,333,691 B2  
APPLICATION NO. : 15/709999  
DATED : June 25, 2019  
INVENTOR(S) : Dong Han et al.

Page 1 of 1

It is certified that error appears in the above-identified patent and that said Letters Patent is hereby corrected as shown below:

On the Title Page

Column 2, Line 15 item (57):
In the Abstract, after "Fast Fourier Transform that are used" delete "b" and insert -- by --, therefor.

In the Claims

Column 19, Line 23:
In Claim 10, delete "comprisinq:" and insert -- comprising: --, therefor.

Signed and Sealed this
Twelfth Day of November, 2019

Andrei Iancu
*Director of the United States Patent and Trademark Office*